US011721985B2

(12) United States Patent
Chen et al.

(10) Patent No.: US 11,721,985 B2
(45) Date of Patent: Aug. 8, 2023

(54) BIDIRECTIONAL BATTERY CHARGING SYSTEM INCLUDING CAPACITOR DIVIDER CIRCUIT

(71) Applicant: RENESAS ELECTRONICS AMERICA INC., Milpitas, CA (US)

(72) Inventors: Yen-Mo Chen, Ottawa, NC (US); Sungkeun Lim, Milpitas, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 208 days.

(21) Appl. No.: 17/181,850

(22) Filed: Feb. 22, 2021

(65) Prior Publication Data

US 2021/0265842 A1 Aug. 26, 2021

Related U.S. Application Data

(60) Provisional application No. 62/981,335, filed on Feb. 25, 2020.

(51) Int. Cl.
*H02J 7/00* (2006.01)

(52) U.S. Cl.
CPC ......... *H02J 7/0013* (2013.01); *H02J 7/00711* (2020.01); *H02J 7/007182* (2020.01)

(58) Field of Classification Search
CPC .............. H02J 7/0013; H02J 7/00711; H02J 7/007182; H02J 7/0024; H02J 7/0048; H02J 7/342; H02J 1/106; H02J 7/0018
USPC ...................................................... 320/137
See application file for complete search history.

(56) References Cited

U.S. PATENT DOCUMENTS

| 8,736,231 | B2* | 5/2014 | Sutardja ................ | H02J 7/0014 320/117 |
| 9,472,961 | B2* | 10/2016 | De Cock ............... | H02J 7/0019 |
| 10,516,284 | B2* | 12/2019 | Maalouf ................. | H02M 3/07 |
| 10,903,738 | B2* | 1/2021 | Zhang ..................... | H02M 1/08 |
| 11,159,032 | B2* | 10/2021 | Womac ................... | H02M 7/48 |
| 2019/0044436 | A1* | 2/2019 | Hijazi ..................... | H02M 1/10 |

* cited by examiner

*Primary Examiner* — M Baye Diao
(74) *Attorney, Agent, or Firm* — Foley & Lardner LLP

(57) ABSTRACT

Example implementations include a charging device with a capacitor divider circuit including a plurality of battery state inputs operably coupleable to a plurality of battery devices, and a pulse width modulation (PWM) generator operable to selectively charge the battery devices, a plurality of switching transistors each operatively coupled at a gate terminal thereof to a respective PWM control output of a plurality of PWM control outputs, and a flying capacitor operatively coupled at a first terminal thereof to a first plurality of the switching transistors, operatively coupled at a second terminal thereof to a second plurality of the switching transistors. Example implementations further include a comparator operatively coupled to the capacitor divider circuit and operable to determine whether a difference between voltages associated with the battery devices satisfies a voltage threshold, where the capacitor divider circuit is further operable to, in response to a determination that the difference satisfies the voltage threshold, block charging of one or more of the battery devices.

8 Claims, 5 Drawing Sheets

BIDIRECTIONAL BATTERY CHARGING SYSTEM INCLUDING CAPACITOR DIVIDER CIRCUIT

CROSS-REFERENCE TO RELATED PATENT APPLICATIONS

This application claims priority to U.S. Provisional Patent Application Ser. No. 62/981,335, entitled "BIDIRECTIONAL CAP DIVIDER FOR BATTERY CHARGING OF MOBILE DEVICES," filed Feb. 25, 2020, the contents of such application being hereby incorporated by reference in its entirety and for all purposes as if completely and fully set forth herein.

TECHNICAL FIELD

The present implementations relate generally to electrical power systems, and more particularly to a bidirectional battery charging system including a capacitor divider circuit.

BACKGROUND

Electronic devices, including mobile electronic devices, include increasingly complex power systems. These power systems can vary in or lack sufficient power storage capacity and efficient power delivery characteristics. Conventional systems can thus lack capability to effectively control and optimize power delivery in systems including multiple batteries.

SUMMARY

It is advantageous to control an electronic system with multiple power sources to efficiently deliver power to multiple power devices. Where power sources are or include batteries, it is also advantageous to reduce the size and complexity of electronic components to reduce power consumption. Where electronic devices are mobile device, it is also advantageous to reduce the size and complexity of electronic components to reduce size and weight to improve portability and the like. In battery systems, it is also advantageous to efficiently balance power consumption, charge levels, and recharging across multiple batteries, battery cells, battery stacks, and the like. Thus, a technological solution for a bidirectional battery charging system including a capacitor divider circuit is desired.

Example implementations include a charging device with a capacitor divider circuit including a plurality of battery state inputs operably coupleable to a plurality of battery devices, and a pulse width modulation (PWM) generator operable to selectively charge the battery devices, a plurality of switching transistors each operatively coupled at a gate terminal thereof to a respective PWM control output of a plurality of PWM control outputs, and a flying capacitor operatively coupled at a first terminal thereof to a first plurality of the switching transistors, operatively coupled at a second terminal thereof to a second plurality of the switching transistors.

Example implementations further include a comparator operatively coupled to the capacitor divider circuit and operable to determine whether a difference between voltages associated with the battery devices satisfies a voltage threshold, where the capacitor divider circuit is further operable to, in response to a determination that the difference satisfies the voltage threshold, block charging of one or more of the battery devices.

Example implementations also include a charging system with an inductive charger operatively coupled to a first system node and a battery node at an output terminal thereof, the first system node operable to supply a first system voltage, a plurality of battery devices operably coupled to a second system node and the battery node, the second system node operable to supply a second system voltage, and a charging device operatively coupled to the battery node and the second system node, and including a capacitor divider circuit including a plurality of battery state inputs operably coupleable to a plurality of battery devices, and a pulse width modulation (PWM) generator operable to selectively charge the battery devices, a plurality of switching transistors each operatively coupled at a gate terminal thereof to a respective PWM control output of a plurality of PWM control outputs, and a flying capacitor operatively coupled at a first terminal thereof to a first plurality of the switching transistors, operatively coupled at a second terminal thereof to a second plurality of the switching transistors.

Example implementations also include a charging system with an inductive charger operatively coupled to a first system node and a second system node at an output terminal thereof, the first system node operable to supply a first system voltage and the second system node operable to supply a second system voltage, a plurality of battery devices operably coupled to the second system node and a battery node, and a charging device operatively coupled to the battery node and the second system node, and including a capacitor divider circuit including a plurality of battery state inputs operably coupleable to a plurality of battery devices, and a pulse width modulation (PWM) generator operable to selectively charge the battery devices, a plurality of switching transistors each operatively coupled at a gate terminal thereof to a respective PWM control output of a plurality of PWM control outputs, and a flying capacitor operatively coupled at a first terminal thereof to a first plurality of the switching transistors, operatively coupled at a second terminal thereof to a second plurality of the switching transistors.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Figure 1:
FIG. 1 illustrates an example charging device, in accordance with present implementations.

FIG. 1 illustrates an example charging device, in accordance with present implementations. As illustrated by way of example in FIG. 1, an example charging device 100 includes a bidirectional multi-battery controller 110 having a first battery input 120, a second battery input 122, a first output 130, and a second output 132. In some implementations, the bidirectional multi-battery controller 110 includes one or more logical or electronic devices including but not limited to integrated circuits, logic gates, flip flops, gate arrays, programmable gate arrays, and the like.

The first battery input 120 is operatively coupleable to a first battery having a first power capacity. In some implementations, the first battery input 120 operatively, integrably, or detachably couples the first battery to one or more sensors of the bidirectional multi-battery controller 110 operable to detect one or more conditions of the first battery. Similarly, the second battery input 122 is operatively coupleable to a second battery having a second power capacity. In some implementations, the second battery input 120 operatively, integrably, or detachably couples the first battery to one or more sensors of the bidirectional multi-battery controller 110 operable to detect one or more conditions of the first battery.

The first output 130 is operatively coupleable to a system node, power input node, power input interface, or the like. In some implementations, the first output 130 generates an output voltage having a magnitude relative to the second output 132. In some implementations, the magnitude of the first output 130 is a proportion, ratio, or the like with respect to the second output 132. As one example, the first output 130 can output a voltage have a magnitude twice as great as a magnitude of voltage output at the second output 132. In some implementations, the bidirectional multi-battery controller 110 generates the output voltages at outputs 130 and 132 based at least partially on individual voltages at the inputs 120 and 122 relative to each other. In some implementations, the bidirectional multi-battery controller 110 generates the output voltages at outputs 130 and 132 based at least partially on individual voltages at the inputs 120 and 122 relative to a ground voltage, a reference voltage, or the like.

The second output 132 is operatively coupleable to a system node, power input node, power input interface, or the like. In some implementations, the bidirectional multi-battery controller 110 generates an output voltage at the second output 132 different than an output voltage at the first output 130. It is to be understood that the bidirectional multi-battery controller 110 is not limited to generating a particular output voltage, and can generate a particular output current or the like in addition to or instead of generating a particular output voltage.

Figure 2:
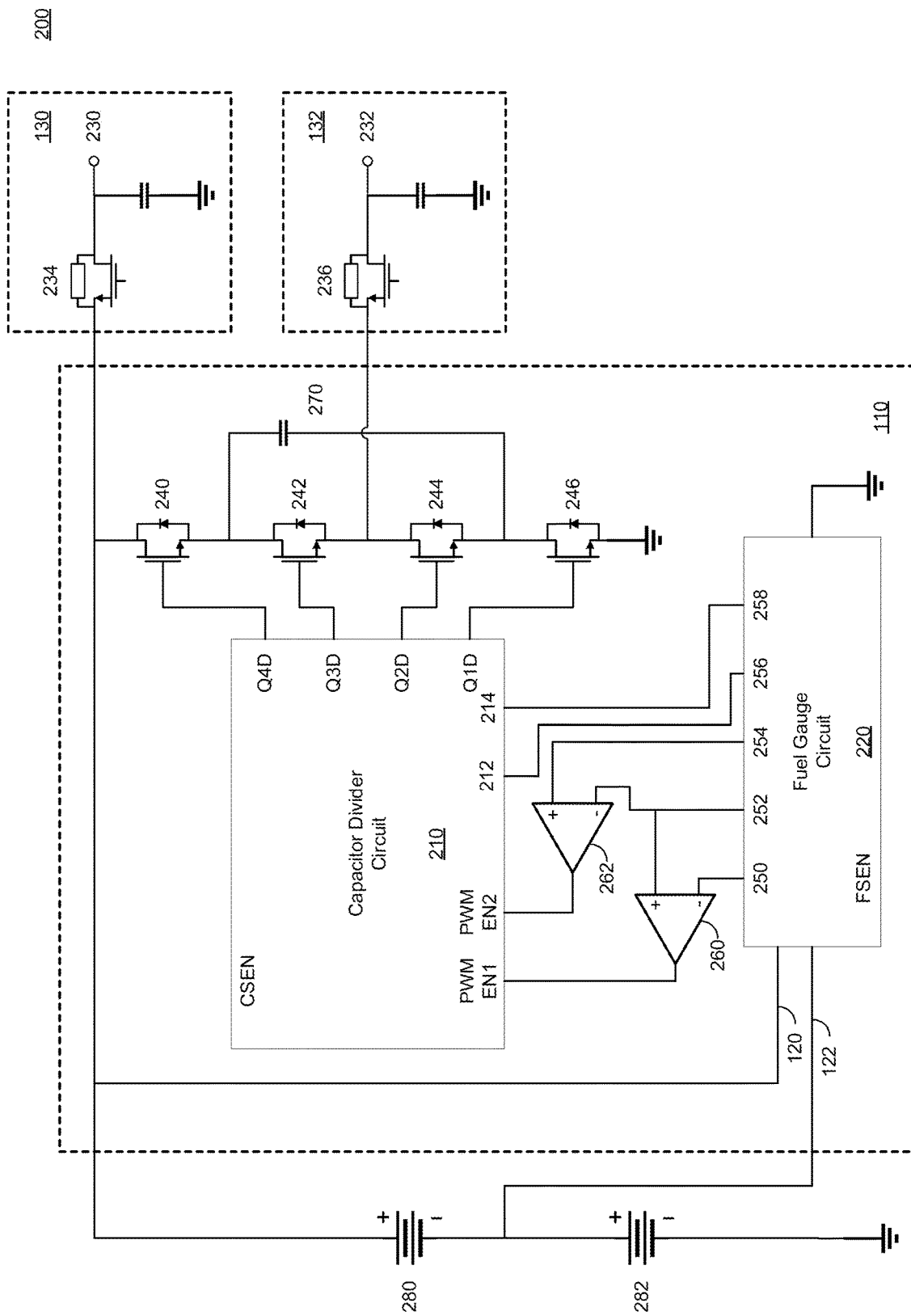
FIG. 2 illustrates an example charging device further to the example device of FIG. 1.

FIG. 2 illustrates an example charging device further to the example device of FIG. 1. As illustrated by way of example in FIG. 2, an example device 200 includes the bidirectional multi-battery controller 110, the first battery input 120, the second battery input 122, the proportional output 130, and the output 132. The bidirectional multi-battery controller 110 includes a capacitor divider circuit 210, a fuel gauge circuit 220, switching transistors 240, 242, 244, and 246, comparators 260 and 262, a flying capacitor 270, a first battery 280, and a second battery 282.

The capacitor divider circuit 210 is operable to activate and deactivate one or more of the switching transistors 240, 242, 244, and 246 at least partially in response to input from the fuel gauge circuit 220. In some implementations, the capacitor divider circuit 210 is operable to selectively activate or deactivate one or more of the switching transistors 240, 242, 244, and 246 in accordance with a pulse-width modulation (PWM) pattern. In some implementations, the capacitor divider circuit 210 includes one or more logical or electronic devices including but not limited to integrated circuits, logic gates, flip flops, gate arrays, programmable gate arrays, and the like. It is to be understood that any electrical, electronic, or like devices, or components associated with the capacitor divider circuit 210 can also be associated with, integrated with, integrable with, replaced by, supplemented by, complemented by, or the like, the bidirectional multi-battery controller 110 or any component thereof.

In some implementations, the capacitor divider circuit 210 includes a system enable input (CSEN), a first PWM enable input (PWMEN1), and a second PWM enable input (PWMEN2). In some implementations, CSEN is operable to activate or deactivate the capacitor divider circuit 210 in accordance with conditions, states, thresholds, or the like associated with one or more of the bidirectional multi-battery controller 110, the first battery 280, and the second battery 282. In some implementations, one or more of PWMEN1 and PWMEN2 are operable to activate or deactivate the capacitor divider circuit 210 in accordance with conditions, states, thresholds, or the like associated with one or more of control signal received thereto. In some implementations, each of PWMEN1 and PWMEN2 are operable to independently activate or deactivate the capacitor divider circuit 210. In some implementations, PWMEN1 and PWMEN2 are operable to deactivate the capacitor divider circuit 210 in response to receiving an input voltage having a magnitude less than or equal to zero. The capacitor divider circuit 210 is further operable to receive battery current input at a battery current input 212 and battery state input at a battery state input 214.

The fuel gauge circuit 220 is operable to determine one or more battery characteristics and to generate one or more battery state outputs indicating and corresponding to the one or more battery characteristics. In some implementations, the fuel gauge circuit 220 is operatively coupled to the capacitor divider circuit 210 and supplies one or more of the battery state outputs to the capacitor divider circuit. In some implementations, the fuel gauge circuit 220 includes one or more logical or electronic devices including but not limited to integrated circuits, logic gates, flip flops, gate arrays, programmable gate arrays, and the like. It is to be understood that any electrical, electronic, or like devices, or components associated with the fuel gauge circuit 220 can also be associated with, integrated with, integrable with, replaced by, supplemented by, complemented by, or the like, the bidirectional multi-battery controller 110 or any component thereof.

In some implementations, the fuel gauge circuit 220 includes one or more of a system enable input (FSEN), a maximum battery difference voltage threshold output (ΔVBATmax) 250, a battery difference voltage output (ΔVBAT) 252, a minimum battery difference voltage threshold output (ΔVBATmin) 254, a battery current state output (IBAT) 256, and a battery state of charge output (SOC) 258. In some implementations, the fuel gauge circuit 220 generates one or more characteristics voltages, currents, or the like at the outputs 250, 252, 254, 256 and 258 indicative of corresponding characteristics respective thereto. It is to be understood that fuel gauge circuit 220 can generate any electrical, electronic, or like characteristic indicative thereof.

The maximum battery difference voltage threshold output (ΔVBATmax) 250 indicates a first predetermined magnitude of difference between a voltage of the first battery 280 and the second battery 282. In some implementations, the fuel gauge circuit 220 obtains ΔVBATmax as a predetermined value by a programming, flashing, or like operation. In some implementations, the fuel gauge circuit 220 includes a memory, register, or the like operable to store ΔVBATmax as a digital or discrete value. The battery difference voltage output (AVBAT) 252 indicates a current or substantially current magnitude of difference between a voltage of the first battery 280 and the second battery 282. In some implementations, the fuel gauge circuit 220 generates ΔVBAT based at least partially on a voltage obtained at inputs 120 and 122, and a ground, reference or like node integrated with or associated with the fuel gauge circuit 220. The minimum battery difference voltage threshold output (ΔVBATmin) 254 indicates a second predetermined magnitude of difference between a voltage of the first battery 280 and the second battery 282. In some implementations, the fuel gauge circuit 220 obtains ΔVBATmin as a predetermined value by a programming, flashing, or like operation concurrent with or separate from a corresponding operation with respect to ΔVBATmax. In some implementations, the fuel gauge circuit 220 includes a memory, register, or the like operable to store ΔVBATmax as a digital or discrete value. In some implementations, the fuel gauge circuit 220 includes a memory, register or the like operable to store ΔVBATmax distinct from the corresponding storage structure associated with ΔVBATmin.

The battery current state output (IBAT) 256 indicates a current state of one or more battery currents associated with one or more of the first battery 280 and the second battery 282. In some implementations, the state or states of the battery current or currents is based at least partially on input received at the first and second inputs 120 and 122 by the fuel gauge circuit 220. In some implementations, IBAT indicates a ratio of a contemporaneous current through the first battery 280 and a ratio of a contemporaneous current through the second battery 282. Thus, in some implementations, IBAT indicates a proportional current coefficient or the like between currents through the first battery 280 and the second battery 282. It is to be understood that IBAT can alternatively or selectively indicate current through a single one of the first battery 280 and the second battery 282, in response to a selection by the fuel gauge circuit 220 by one or more electronic logical components therein. It is to be further understood that IBAT can alternatively or selectively indicate a current relationship between the first battery 280 and the second battery 282 other than or in addition to a proportional current coefficient relationship, in response to a selection by the fuel gauge circuit 220 by one or more electronic logical components therein.

The battery state of charge output (SOC) 258 indicates a charge state of one or more battery cells associated with one or more of the first battery 280 and the second battery 282. In some implementations, the state or states of the battery charge or charges is based at least partially on input received at the first and second inputs 120 and 122 by the fuel gauge circuit 220. In some implementations, SOC indicates a ratio of a contemporaneous charge at the first battery 280 and a ratio of a contemporaneous charge at the second battery 282. Thus, in some implementations, SOC indicates a proportional charge coefficient or the like between charges at the first battery 280 and the second battery 282. It is to be understood that SOC can alternatively or selectively indicate charge at a single one of the first battery 280 and the second battery 282 or a particular cell or stack thereof, in response to a selection by the fuel gauge circuit 220 by one or more electronic logical components therein. It is to be further understood that SOC can alternatively or selectively indicate a charge relationship between the first battery 280 and the second battery 282 other than or in addition to a proportional charge coefficient relationship, in response to a selection by the fuel gauge circuit 220 by one or more electronic logical components therein.

The switching transistors 240, 242, 244, and 246 are each operatively coupled at respective gate terminals thereof to the capacitor divider circuit 210. In some implementations, each gate terminal of the switching transistors 240, 242, 244, and 246 is respectively coupled to a gate driver output terminal of the capacitor divider circuit. Thus, in some implementations, the switching transistor 240 is operatively coupled to gate river output terminal Q4D, the switching transistor 242 is operatively coupled to gate river output terminal Q3D, the switching transistor 244 is operatively coupled to gate river output terminal Q2D, and the switching transistor 246 is operatively coupled to gate river output terminal Q1D. In some implementations, the switching transistors 240, 242, 244, and 246 are operatively coupled in series at their source and drain terminals between a system voltage node and a ground, reference, or like node. As one example, the switching transistor 240 is connected to a system voltage node at a drain terminal thereof and connected to the switching transistor 242 at a source terminal thereof, the switching transistor 242 is connected to the switching transistor 240 at a drain terminal thereof and connected to the switching transistor 244 at a source terminal thereof, the switching transistor 244 is connected to the switching transistor 242 at a drain terminal thereof and connected to the switching transistor 246 at a source terminal thereof, and the switching transistor 246 is connected to the switching transistor 244 at a drain terminal thereof and connected to the reference, ground, or like node at a source terminal thereof.

The comparator 260 is operable to generate a voltage difference state signal indicating whether a maximum voltage condition threshold has been satisfied. In some implementations, the comparator 260 is operable to determine whether the maximum voltage condition has been satisfied concurrently with operation of the capacitor divider circuit 210. In some implementations, the comparator 260 is operatively coupled to PWMEN1 of the capacitor divider circuit 210 at an output terminal thereof, to the ΔVBATmax output 250 at an inverting input thereof, and to the ΔVBAT output 252 at a noninverting input thereof.

The comparator 262 is operable to generate a voltage difference state signal indicating whether a minimum voltage condition threshold has been satisfied. In some implementations, the comparator 262 is operable to determine whether the minimum voltage condition has been satisfied concurrently with operation of the capacitor divider circuit 210. In some implementations, the comparator 262 is operatively coupled to PWMEN2 of the capacitor divider circuit 210 at an output terminal thereof, to the ΔVBAT output 252 at an inverting input thereof, and to the ΔVBATmin output 252 at a noninverting input thereof.

The flying capacitor 270 is operable to complete various current paths in response to selective activation and deactivation of one or more of the switching transistors 240, 242, 244 and 246. In some implementations, the capacitor divider circuit 210 is operable to selectively and alternatingly activate and deactivate pairs of the switching transistors in accordance with a PWM switching cycle. In some implementations, capacitor divider circuit 210 is operable to selectively activate and deactivate switching transistors 240 and 244 as a first pair, and is operable to selectively activate and deactivate switching transistors 242 and 246 as a second pair. Thus, in some implementations, in a first activation state in which the switching transistors 240 and 244 are activated and the switching transistors 242 and 246 are deactivated, the flying capacitor 270 creates a first current path coupling the flying capacitor 270 from the reference, ground, or like node. Further, in some implementations, in a second activation state in which the switching transistors 242 and 246 are activated and the switching transistors 240 and 242 are deactivated, the flying capacitor 270 creates a second current path decoupling the flying capacitor to the reference, ground, or like node.

The first battery 280 and the second battery 282 each include one or more electrical, electronic, electromechanical, electrochemical, or like devices or systems for at least one of receiving, storing and distributing input power. In some implementations, the first battery 280 and the second battery 282 each include one or more stacks of batteries. In some implementations, the first battery 280 and the second battery 282 each include lithium-ion or like energy storage. In some implementations, the first battery 280 and the second battery 282 each include is integrated with, integrable with, or separable from the bidirectional multi-battery controller 110. In some implementations, the first battery 280 and the second battery 282 each include a plurality of battery units variously or entirely integrated with, integrable with, or separable from the bidirectional multi-battery controller 110. In some implementations, the first battery 280 and the second battery 282 are operatively coupled in series. Thus, in some implementations, the first battery 280 is operatively coupled at a first terminal thereof to the first input node 120 and at a second terminal thereof to the second input node 122. Further, in some implementations, the second battery 282 is operatively coupled at a first terminal thereof to the second input node 122 and at a second terminal thereof to the ground, reference, or like node. In some implementations, at least one of the first output 130 and the second output 132 includes a respective protection transistor 234 or 236. In some implementations, a protection transistor includes a resistive or like element operatively coupled between a source and drain terminal thereof. In some implementations, the resistive or like element is or includes a fuse or the like.

Figure 3:
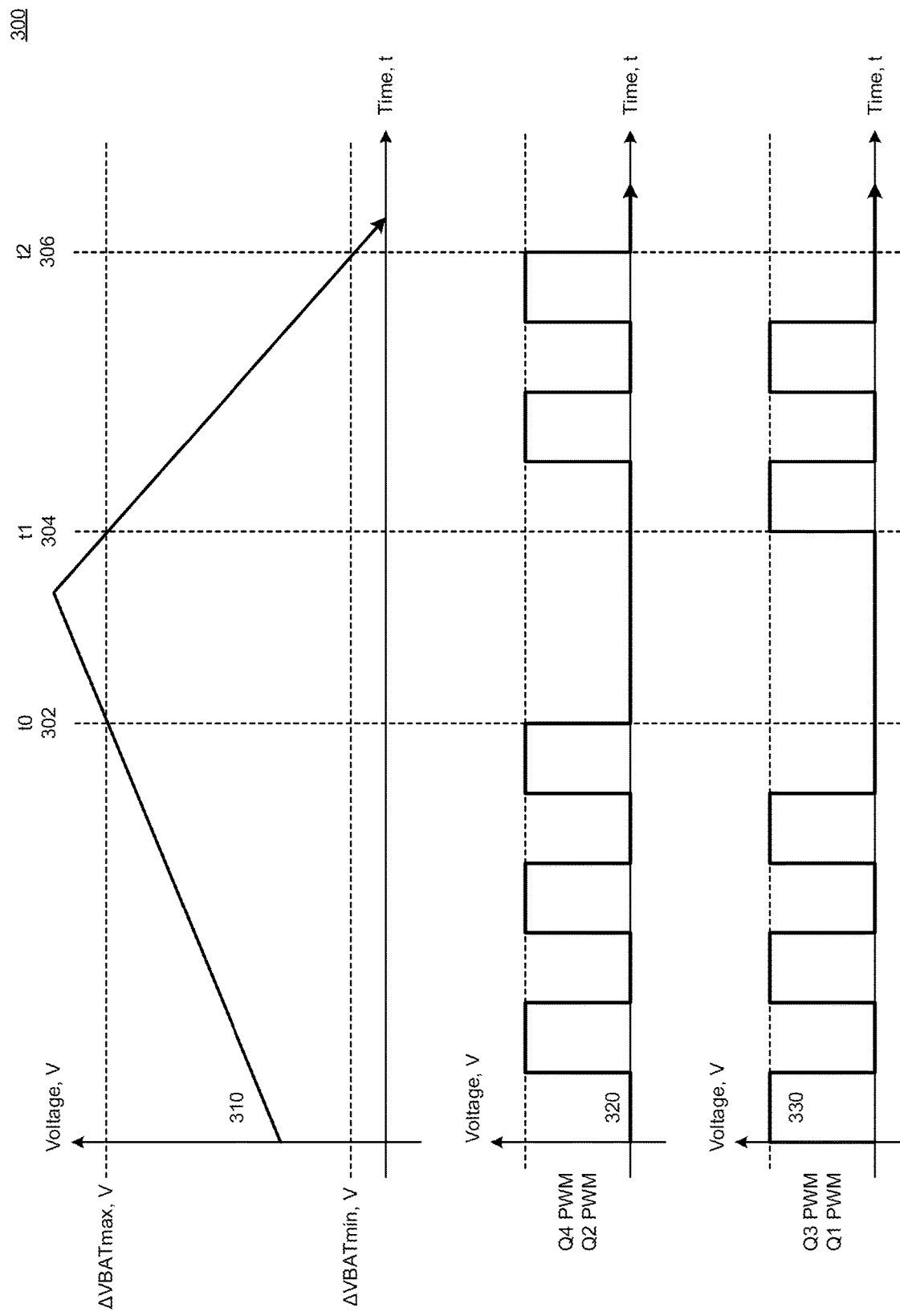
FIG. 3 illustrates an example timing diagram associated with the example charging device, in accordance with present implementations.

FIG. 3 illustrates an example timing diagram associated with the example charging device, in accordance with present implementations. As illustrated by way of example in FIG. 3, an example timing diagram 300 includes a battery voltage difference waveform 310, a first switching transistor waveform 320, and a second switching transistor voltage waveform 330. In some implementations, the first switching transistor waveform 320 is associated with corresponding and concurrent switching states of the switching transistors 240 and 244, in response to corresponding and concurrent activation and deactivation signals received respectively from Q4D and Q2D. As one example, the capacitor divider circuit 210 simultaneously or substantially simultaneously activates and deactivates the switching transistors 240 and 244. In some implementations, the second switching transistor waveform 330 is associated with corresponding and concurrent switching states of the switching transistors 242 and 246, in response to corresponding and concurrent activation and deactivation signals received respectively from Q3D and Q1D. As one example, the capacitor divider circuit 210 simultaneously or substantially simultaneously activates and deactivates the switching transistors 242 and 246 according to a duty cycle substantially opposite to, substantially an inversion of, or the like, of that of the first switching transistor waveform 320.

Before time t0 302, the battery voltage difference waveform 310 is above ΔVBATmin and is rising toward ΔVBATmax. Concurrently, the first switching transistor waveform 320 is alternating between a low state and a high state in accordance with a first duty cycle, and the second switching transistor waveform 330 is alternating between a high state and a low state in accordance with a second duty cycle substantially opposite to, substantially an inversion of, or the like, of that of the first switching transistor waveform 320.

At time t0 302, the battery voltage difference waveform 310 is above ΔVBATmin, reaches ΔVBATmax, and continues increasing beyond ΔVBATmax. Concurrently, the first switching transistor waveform 320 ceases alternating between a low state and a high state in accordance with a first duty cycle, and the second switching transistor waveform 330 ceases alternating between a high state and a low state in accordance with a second duty cycle substantially opposite to, substantially an inversion of, or the like, of that of the first switching transistor waveform 320. In some implementations, the capacitor divider circuits ceases alternating of the waveforms 320 and 330 by deactivating at least one of the switching transistors 240, 242, 244 and 246. In response, ΔVBAT begins decreasing from a maximum. In some implementations, ΔVBAT begins decreasing from its maximum after a delay period. In some implementations, the delay period is or is associated with a hysteretic delay corresponding to operation of an inductive charger or the like.

At time t1 304, the battery voltage difference waveform 310 decreases to ΔVBATmax and continues decreasing below ΔVBATmax. Concurrently, the first switching transistor waveform 320 restarts alternating between a low state and a high state in accordance with a first duty cycle, and the second switching transistor waveform 330 restarts alternating between a high state and a low state in accordance with a second duty cycle substantially opposite to, substantially an inversion of, or the like, of that of the first switching transistor waveform 320.

At time t2 306, the battery voltage difference waveform 310 reaches ΔVBATmin, and continues decreasing beyond ΔVBATmin. Concurrently, the first switching transistor waveform 320 ceases alternating between a low state and a high state in accordance with a first duty cycle, and the second switching transistor waveform 330 ceases alternating between a high state and a low state in accordance with a second duty cycle substantially opposite to, substantially an inversion of, or the like, of that of the first switching transistor waveform 320. In some implementations, the capacitor divider circuits ceases alternating of the waveforms 320 and 330 by deactivating at least one of the switching transistors 240, 242, 244 and 246. It is to be understood that the bidirectional multi-battery controller 110 can operate without entering the state indicated at time t2 306. Thus, in some implementations, the bidirectional multi-battery controller 110 can maintain operation above ΔVBATmin and regulate its operation under conditions including an increase of ΔVBAT over ΔVBATmax to return to an operating mode in which ΔVBAT is between ΔVBATmax and ΔVBATmin.

Figure 4:
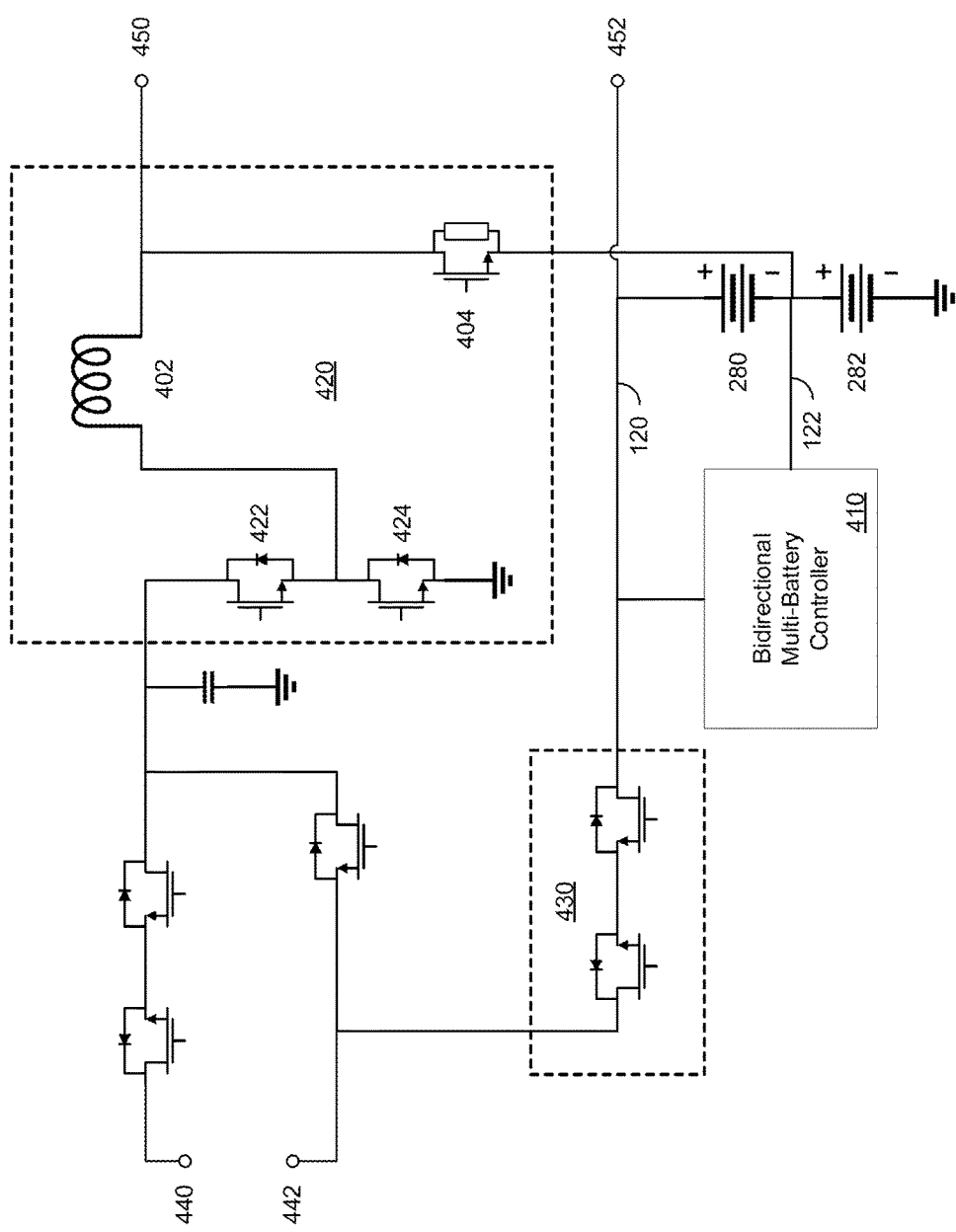
FIG. 4 illustrates a first example charging system including the example charging device, in accordance with present implementations.

FIG. 4 illustrates a first example charging system including the example charging device, in accordance with present implementations. As illustrated by way of example in FIG. 4, an example charging system 400 includes the first battery 280, the second battery 282, a bidirectional multi-battery controller 410, an inductive charger 420, a direct charger 430, a first system input 440, a second system input 442, a first system output 450 and a second system output 452.

The bidirectional multi-battery controller 410 corresponds to the bidirectional multi-battery controller 110, where the first output 130 is operatively coupled to the second system output 452 and the second output 132 is operatively coupled to the first system output 450. In some implementations, the first input 120 is operatively coupled to the direct charger 430 and to the second system output 452. In some implementations, the second input 122 of operatively coupled to the first battery 280 and the second battery 282 at a battery node disposed therebetween. In some implementations, the first battery 280 and the second battery 282 are operatively coupled in series between the second system output 452 and a ground, reference, or like node.

The inductive charger 420 is operable to provide a regulated power output to the first system output 450. In some implementations, the inductive charger 420 includes an inductor 402, a high-side buck transistor 422, a low-side buck transistor 424, and a battery transistor 404. In some implementations, the battery transistor 404 is operatively coupled at a drain terminal thereof to the first system output 450 and at a source terminal thereof to the first battery 280 and the second battery 282.

The direct charger 430 is operable to provide predetermined charging power directly to one or more of the first battery 280 and the second battery 282. In some implementations, the predetermined charging power has one or more voltage, current, or like characteristics. In some implementations, the predetermined charging power has one or more power characteristics corresponding to USB, USB-C, USB-C power delivery (PD), or the like. In some implementations, the direct charger 430 is or includes two back-to-back diode-backed switching transistors.

The first system input 440 is operable to receive input power from a first input source. In some implementations, the first input source 440 is operatively coupled to a wireless power charging circuit, pad, coil, or the like. In some implementations, the first system input 440 is operatively coupled to two back-to-back diode-backed switching transistors. The second system input 442 to receive input power from a second input source. In some implementations, the second input source 442 is operatively coupled to a USB port, a USB-C port, a USB-C power delivery (PD) port, or the like. In some implementations, the second system input 442 is operatively coupled to the direct charger 430 and to a diode-backed switching transistor.

Figure 5:
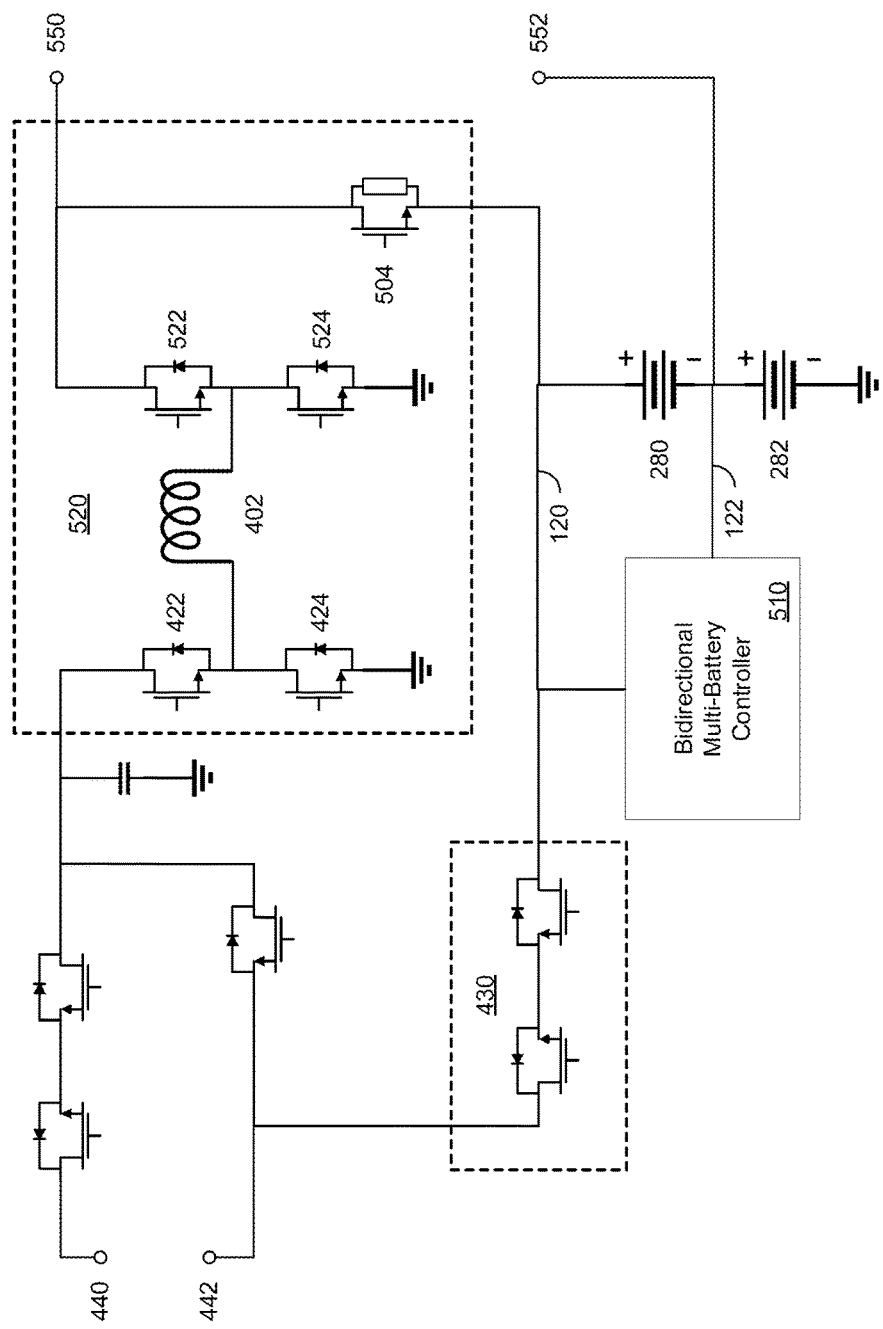
FIG. 5 illustrates a second example charging system including the example charging device, in accordance with present implementations.

FIG. 5 illustrates a second example charging system including the example charging device, in accordance with present implementations. As illustrated by way of example in FIG. 5, an example charging system 500 includes the first battery 280, the second battery 282, the direct charger 430, the first system input 440, the second system input 442, a bidirectional multi-battery controller 510, an inductive charger 520, a first system output 550 and a second system output 552.

The bidirectional multi-battery controller 510 corresponds to the bidirectional multi-battery controller 110, where the first output 130 is operatively coupled to the first system output 550 and the second output 132 is operatively coupled to the second system output 552. In some implementations, the first input 120 is operatively coupled to the direct charger 430. In some implementations, the second input 122 is operatively coupled to the first battery 280 and the second battery 282 at a battery node disposed therebetween. In some implementations, the second input 122 is operatively coupled to the second system output 552.

The inductive charger 520 is operable to provide a regulated power output to the first system output 550. In some implementations, the inductive charger 520 includes the high-side buck transistor 422, the low-side buck transistor 424, a battery transistor 504, a high-side boost transistor 522, and a low-side boost transistor 524. In some implementations, the battery transistor 504 is operatively coupled at a drain terminal thereof to the first system output 550 and at a source terminal thereof to the second system output 552.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A charging device, comprising:
    a capacitor divider circuit including a plurality of battery state inputs operably coupleable to a plurality of battery devices, and a pulse width modulation (PWM) generator operable to selectively charge the battery devices;
    a plurality of switching transistors each operatively coupled at a gate terminal thereof to a respective PWM control output of a plurality of PWM control outputs; and
    a flying capacitor operatively coupled at a first terminal thereof to a first plurality of the switching transistors, operatively coupled at a second terminal thereof to a second plurality of the switching transistors;
    a first comparator operatively coupled to the capacitor divider circuit and operable to determine whether a first difference between voltages associated with the battery devices satisfies a first voltage threshold; and
    a second comparator operatively coupled to the capacitor divider circuit and operable to determine whether a second difference between voltages associated with the battery devices satisfies a second voltage threshold,
    wherein the capacitor divider circuit is further operable to, in response to a determination that the first difference satisfies the voltage threshold, block charging of one or more of the battery devices, and
    wherein the second voltage threshold is a minimum device voltage threshold, and the determination that the second difference satisfies the second voltage threshold comprises a determination that the second difference is less than the voltage threshold.

2. The device of claim 1, wherein the capacitor divider circuit is further operable to, in response to a determination that the first difference satisfies the first voltage threshold, or in response to a determination that the second difference satisfies the second voltage threshold, to block charging of one or more of the battery devices.

3. A charging system, comprising:
    an inductive charger operatively coupled to a first system node and a battery node at an output terminal thereof, the first system node operable to supply a first system voltage;
    a plurality of battery devices operably coupled to a second system node and the battery node, the second system node operable to supply a second system voltage; and
    a charging device operatively coupled to the battery node and the second system node, and including
        a capacitor divider circuit including a plurality of battery state inputs operably coupleable to a plurality of battery devices, and a pulse width modulation (PWM) generator operable to selectively charge the battery devices, a plurality of switching transistors each operatively coupled at a gate terminal thereof to a respective PWM control output of a plurality of PWM control outputs, and a flying capacitor operatively coupled at a first terminal thereof to a first plurality of the switching transistors, operatively coupled at a second terminal thereof to a second plurality of the switching transistors.

4. The system of claim 3, wherein the charging device further comprises:

a first comparator operatively coupled to the capacitor divider circuit and operable to determine whether a first difference between voltages associated with the battery devices satisfies a first voltage threshold; and a second comparator operatively coupled to the capacitor divider circuit and operable to determine whether a second difference between voltages associated with the battery devices satisfies a second voltage threshold.

5. The device of claim 4, wherein the inductive charger is a buck charger.

6. A charging system, comprising:

an inductive charger operatively coupled to a first system node and a second system node at an output terminal thereof, the first system node operable to supply a first system voltage and the second system node operable to supply a second system voltage;

a plurality of battery devices operably coupled to the second system node and a battery node; and a charging device operatively coupled to the battery node and the second system node, and including a capacitor divider circuit including a plurality of battery state inputs operably coupleable to a plurality of battery devices, and a pulse width modulation (PWM) generator operable to selectively charge the battery devices, a plurality of switching transistors each operatively coupled at a gate terminal thereof to a respective PWM control output of a plurality of PWM control outputs, and a flying capacitor operatively coupled at a first terminal thereof to a first plurality of the switching transistors, operatively coupled at a second terminal thereof to a second plurality of the switching transistors.

7. The system of claim 6, wherein the charging device further comprises:

a first comparator operatively coupled to the capacitor divider circuit and operable to determine whether a first difference between voltages associated with the battery devices satisfies a first voltage threshold; and a second comparator operatively coupled to the capacitor divider circuit and operable to determine whether a second difference between voltages associated with the battery devices satisfies a second voltage threshold.

8. The device of claim 7, wherein the inductive charger is a buck-boost charger.

* * * * *